United States Patent [19]

Wiebe

[11] Patent Number: 4,821,167

[45] Date of Patent: Apr. 11, 1989

[54] METHOD AND APPARATUS FOR SEQUENTIAL CONTROL OF ANALOGUE SIGNALS

[75] Inventor: Harold D. Wiebe, Cincinnati, Ohio

[73] Assignee: Cincinnati Milacron Inc., Cincinnati, Ohio

[21] Appl. No.: 20,308

[22] Filed: Mar. 2, 1987

[51] Int. Cl.⁴ .................... G06F 15/46; G05B 21/02
[52] U.S. Cl. .................... 364/138; 318/636; 364/139; 364/179; 364/602
[58] Field of Search ............ 364/178, 179, 600, 602, 364/138, 139; 340/347 SH; 318/636

[56] References Cited

U.S. PATENT DOCUMENTS

| | | | |
|---|---|---|---|
| 3,777,128 | 12/1973 | Kirkham | 364/178 |
| 3,872,389 | 3/1975 | Willard | 364/178 |
| 4,001,557 | 1/1977 | Stephenson | 235/151.1 |
| 4,093,989 | 6/1978 | Flink et al. | 364/602 |
| 4,149,256 | 4/1979 | Sumi et al. | 364/602 |
| 4,365,312 | 12/1982 | Nakano et al. | 364/900 |
| 4,530,065 | 7/1985 | Huff | 364/139 X |
| 4,564,831 | 1/1986 | Wheable et al. | 340/347 |

Primary Examiner—Joseph Ruggiero
Attorney, Agent, or Firm—John W. Gregg

[57] ABSTRACT

A method and apparatus are provided for managing a plurality of analogue signals for digital control. Analogue input signals received from a process are periodically sampled and converted to digital input signals for access by a digital control. Digital output signals produced by the digital control are converted to analogue output signals and stored for continuous availability to a controlled process. The sampling and conversion of analogue input signals as well as the conversion and storage of analogue output signals is conducted asynchronously relative to the activity of the digital control by a predetermined program of control signals repetitively produced in response to a clock signal.

13 Claims, 1 Drawing Sheet

METHOD AND APPARATUS FOR SEQUENTIAL CONTROL OF ANALOGUE SIGNALS

BACKGROUND OF THE INVENTION

This invention relates generally to continuous process control. In particular, this invention relates to management of analogue signals for digital process control.

It is known to effect control of processes by programmable digital control. Unlike purely analogue control circuits, a particular control algorithm can be represented by the steps of a program to be executed by the programmable control. Therefore, a single programmable control may be used to control totally independent and unlike processes without resort to unique circuitry.

As a practical matter, process control generally requires that plural process parameters be monitored to produce a desired value of a single control signal. For example, in servo mechanism control two channels of position feedback signals may be used to produce a single control signal. However, when a programmable device is used to control sampling of process parameters, the rate at which sampling must be effected imposes limitations on the program size or the number of process parameters which can be monitored. Further, the programmable control may not provide consistent sampling rates because of dynamically changing program execution times. The present invention overcomes these deficiencies of known systems for digital process control by providing for management of the analogue signals representing process parameters independently of the program execution of the digital control.

SUMMARY OF THE INVENTION

It is one object of the present invention to provide a method and apparatus for programmed management of a plurality of analogue process signals for digital process control.

It is a further object of the present invention to provide a method and apparatus for sequential sampling and selection of input and output analogue signals for digital Process control independent of the digital control.

It is a still further object of the present invention to provide a method and apparatus for sequentially controlled conversion of analogue signals to digital signals and digital signals to analogue signals for managing the translation of analogue signals between a digital control and the controlled process.

Further, objects and advantages of the present invention shall become apparent from the attached drawings and the description thereof.

In accordance with the aforesaid objects, a method and apparatus are provided for programmed management of a plurality of analogue process signals for digital process control. A clock signal is used to sequentially produce control signals for sampling and selecting analogue input and output signals. Analogue input signals are periodically sampled and stored in response to repetitively produced sample signals. Digital input signals representing a selected analogue input signal are produced in response to sequentially produced input select signals. Digital output signals are converted to an analogue signal and stored for continuous availability to the process in response to sequentially produced output select signals.

DETAILED DESCRIPTION OF THE PREFERRED EMBODIMENT

In order to illustrate and explain the present invention, a detailed description of a preferred embodiment shall be given with reference to the drawings. This embodiment corresponds to circuitry used in a servo mechanism control available from Cincinnati Milacron Inc., the assignee of the Present invention. It is not intended to limit the present invention in any way to the particular details of the preferred embodiment. Rather, it is the intention of applicant that the present invention be defined by the scope of the appended claims and all equivalents thereto.

Figure 1:
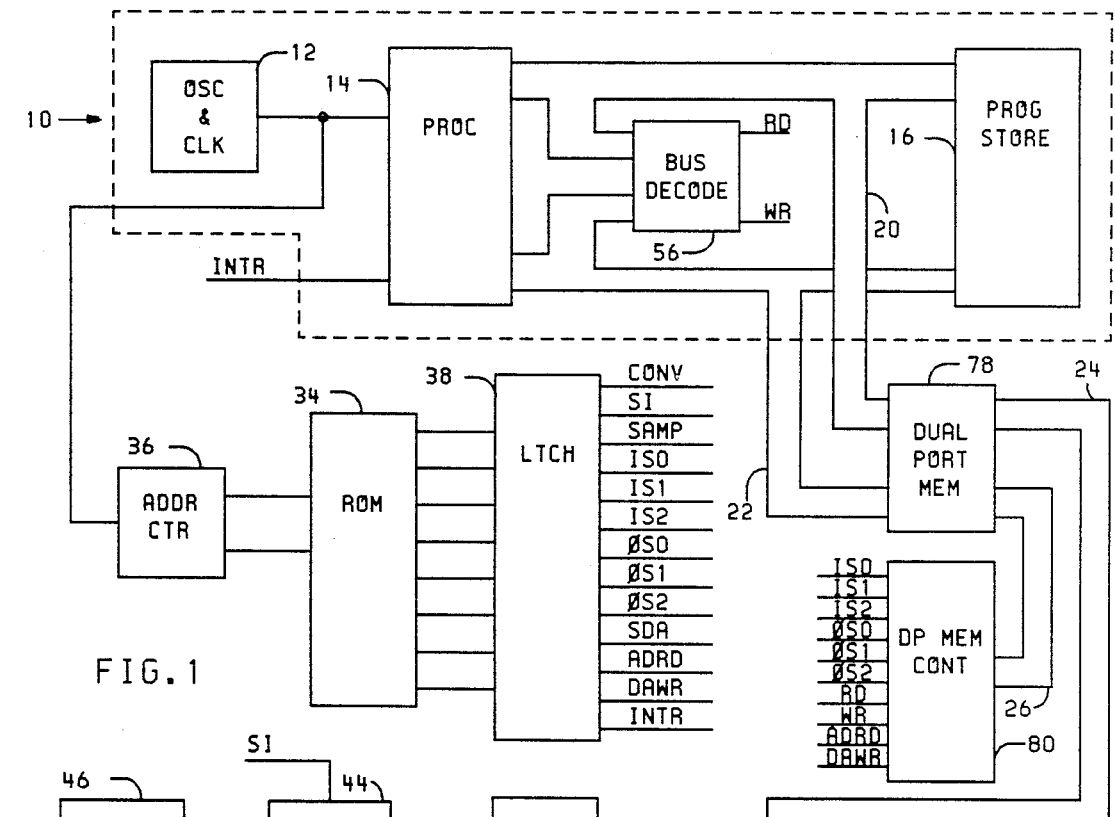
FIG. 1 is a block diagram illustrating a digital process control together with means for independent analogue signal

Referring to FIG. 1, a programmable digital control 10 is shown, including a digital processor 14 and a program store 16 connected over a data bus 20. The digital processor 14 is responsive to a clock signal produced by the oscillator and clock circuitry 12. In general, the processor sequentially generates addresses for the program store 16 and executes instructions retrieved from program store 16 using data stored with the instructions or available from other devices connected to data bus 20. The bus 20 provides for the simultaneous transmission of 16 bit (binary digit) address or data signals both to and from devices connected to the bus. The programmable digital control 10 is generally connected to input and output interface devices (not shown) via bus 20. During execution of the program stored in program store 16, the processor 14 makes logical decisions which result in alternative portions of the program being executed in accordance with current conditions. In addition to logical manipulations, processor 14 carries out arithmetic functions to produce values used in the control of attached devices. The combination of logical selection and variable computation carried out by processor 14 results in dynamically changing periods for program execution. These time variations are readily tolerated with regard to the monitoring and control of binary, i.e. "on" or "off" devices but, as will be more fully explained below, is unsuitable for monitoring and control of continuously variable process parameters.

In order for digital control 10 to effect control over a continuously variable process, it is necessary to produce a digital representation of process parameters. In general, the process parameters are represented by analogue process signals including analogue input signals and analogue output signals defined by the perspective of the digital control 10. That is, analogue input signals are defined as inputs used by digital control 10 to produce outputs. Analogue output signals are defined as the analogue signals output in response to activity of digital control 10. The analogue input signals must be converted to digital input signals for use by the digital control 10. The conversion from analogue input signals to digital input signals requires that the analogue input signal remain constant during the time required for the conversion process. It is therefore necessary that samples of analogue input signals be taken periodically and held for application to an analogue to digital converter. If the sampling interval is subject to change, as would occur if the digital control 10 controlled the sampling interval, the resulting digital input signals could include an error caused by the variation in the sampling interval. Further, the requirement for periodic sampling would consume time otherwise available to the processor 14 which could be used for additional control functions. Likewise, digital output signals produced by digital control 10 must be converted to analogue output signals for use by the controlled process. The analogue signals produced by a digital to analogue converter are held or stored for continuous availability to the controlled process. These analogue output stores must be periodically refreshed to maintain the integrity of the output value.

As illustrated in FIG. 1, means for sequentially producing a sample signal for effecting the sampling and storage of analogue input signals is provided by the combination of read-only memory 34 and address counter 36. The address counter 36 is responsive to a clock signal produced by the oscillator and clock circuitry 12 of digital control 10. The address counter 36 sequentially produces address signals for all of the storage locations of read-only memory 34 used to store a predetermined program of control signals. Read only memory 34 ouputs the control signal stored in the location defined by the address signals input by address counter 36. The clock signal is repetitively produced by oscillator and clock circuitry 12 at a predetermined time interval. Consequently, the output of control signals from read-only memory 34 is likewise repeated in a cyclic fashion determined by the repetition rate of the clock signal and the number of storage locations used. The read-only memory selected by applicant provides eight simultaneous output signals which are temporarily stored in the latch circuits 38 to produce control signals including a sample signal SAMP, input select signals IS0, IS1, IS2, and output select signals OS0. OS1, OS2.

Analogue input signal processing begins with the occurrence of the sample signal SAMP which stores a plurality of analogue input signals within the analogue input store 46. Following storage of the analogue input signals within analogue input store 46, the values of the analogue signals can be converted to digital input signals and transmitted to digital control 10. An analogue to digital converter 40 is provided for converting a single analogue input signal to digital input signals upon the occurrence of a control signal at the convert input. Because the analogue to digital converter 40 is operative to effect conversion of only a single analogue input signal at a time, it is necessary to select an analogue input signal from the analogue input store 46.

The analogue input signal selection is accomplished by the analogue signal multiplexer 44. Three input select signals IS0, IS1 and IS2 identify a selected analogue input signal. A fourth control signal SI enables the transference of the selected analogue input signal to the output of the analogue signal multiplexer 44. The output of the analogue signal multiplexer 44 is buffered by a buffer amplifier 42 and input to the analogue to digital converter 40.

Digital signals representing 12 binary digits are produced by analogue to digital converter 40 and are available at the output of the analogue to digital converter 40 until the occurrence of the next convert control signal CONV. These 12 bits at the output of the analogue to digital converter 40 are transferred over the bus 24 to a dual port memory 78 in response to the analogue to digital converter read signal ADRD. The analogue to digital read signal ADRD is produced sequentially by the read only memory 34 and input to the dual port memory control 80 together with the appropriate combination of select signals IS0 through IS2 for the selected analogue signal. These select signals produce an address input for the dual port memory 78 on the bus 26. The digital representation of the selected analogue input signal is thus made available to the digital control 10 through the dual port memory 78. Processor 14 can acquire the digital data representing a selected analogue input through bus 20 by effecting the production of the read signal RD at the output of a bus decoder 56 and an appropriate address on the bus 22. The read signal RD is input to the dual port memory control 80 to read the selected digital input signal from the dual port memory 78 over the bus 20.

It will be appreciated by those skilled in the art that for each cycle through the sequence of read-only memory addresses it is necessary that the sample signal SAMP and input select signals IS0 through IS2 be produced for sampling each of the analogue input signals. The sampling and selection of analogue input signals is, thereby, effected at constant time intervals.

To effect control over the controlled process, it is necessary that digital output signals of digital control 10 be converted to analogue output signals to be applied to the controlled process. A digital to analogue converter 32 is provided for converting sets of digital output signals produced by digital control 10 to an analogue signal. Each such set may consist of, for example, twelve or sixteen bits, and are referred to as words. The digital control 10 writes a value of a selected digital output word into the dual port memory by effecting the production of the write signal WR at the output of bus decoder 56 and by supplying the appropriate address over bus 22. The conversion process occurs in response to the production of a digital to analogue write signal DAWR and the output select signals OS0, OS1, OS2 by the read only memory 34. The select signals OS0, OS1, and OS2 define an address input to the dual port memory on bus 26. The digital output signals are transferred from the dual port memory 80 to the digital to analogue converter 32 over bus 24 with the production of the digital to analogue write signal DAWR. The digital to analogue converter produces a single analogue signal in response to a set of digital output signals.

The analogue signal produced by the digital to analogue converter 32 is stored in the analogue store 52 and output through buffer 54. The analogue store 52 includes a storage circuit for each of a plurality of analogue output signals and must be periodically refreshed to maintain the desired value of the analogue output signals stored in the storage circuits. In order to produce current values for all analogue output signals, it is necessary to select each analogue storage circuit during a complete cycle through the read only memory addresses by address counter 36. The output select signals OS0, OS1, and OS2 also serve as select signals to accomplish the selection of analogue storage circuits. The analogue signal at the output of the digital to analogue converter 32 is buffered by amplifier 48 and applied to the input of the analogue demultiplexer 50. With the output select signals identifying a selected analogue storage circuit, a further control signal SDA is produced at the output of latch 38 to effect transfer of the analogue output signal to a selected analogue storage circuit in the output analogue store 52. The newly stored value is immediately available as an analogue output signal at the output of the buffer 54. The digital output signal retrieved from dual port memory 78 may be a new value from digital control 10 or a previously stored value if no change in the analogue output is commanded.

It will now be appreciated that with each cycle through the addresses of read-only memory 34, current values of each analogue input signal are made available as digital input signals to the digital control 10 and current values of analogue output signals are produced. Because the operation of the digital control 10 is asynchronous with the production of control signals at the output of latch 38, it would be possible for the analogue circuitry to attempt to read from or write to a location in dual port memory at the same time as the digital control 10. To avoid this potential contention, an interrupt signal INTR is produced at the output of latch 38 at a time when no access to the dual port memory 78 will be made by the analogue circuitry for a predetermined interval of time. This interval is controlled by the clock frequency and the relative spacing within read only memory 34 between the interrupt signal INTR and the next occurrence of either control signal ADRD or DAWR. This interrupt signal causes processor 14 to suspend the operation it is performing when the interrupt signal occurs and to proceed with reading from and writing to dual port memory 78. Processor 14 completes the exchange of data with dual port memory 78 within the predetermined time interval and returns to performance of the operation which was interrupted. In this fashion, the interpretation of new input signals by the digital control 10 and its production of new output signals proceeds entirely independently of the processing of input and output signals by the analogue circuitry.

The analogue input store circuitry shall be described with reference to FIG. 2. A differential amplifier 60 is Provided to receive each analogue input signal. The differential amplifer provides rejection of electrical noise common to both the signal and return lines associated with the analogue input signal. Sampling of an analogue input signal is effected by the analogue switch 62. Upon the occurrence of the sample signal SAMP the analogue switch connects the analogue input signal at the output of amplifier 60 to the following resistor-capacitor network comprised of resistor 64 and capacitor 66. The time constant of this network dictates the time required to charge capacitor 66 to the value of the analogue input signal. This time constant, in turn dictates the required duration of the sample signal, While the sample signal is inactive, the analogue switch 62 is open and the value stored on the capacitor will decay through the high impedance of the input circuitry of analogue multiplexer 44.

Figure 2:
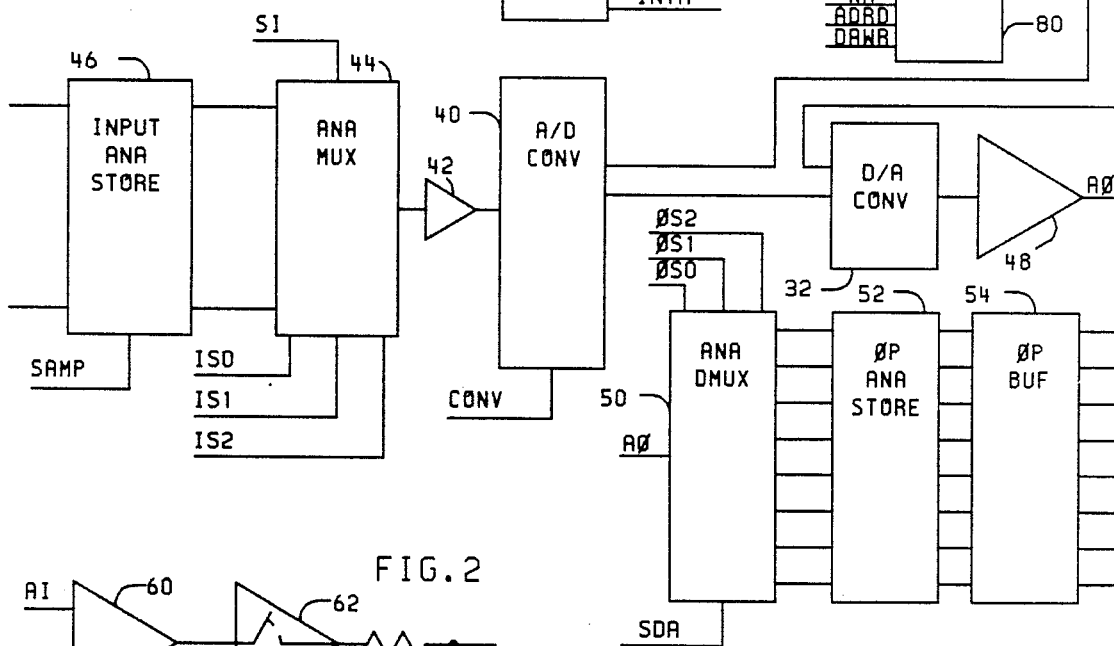
FIG. 2 is a schematic diagram of the circuitry of an input analogue signal store.
Figure 2:
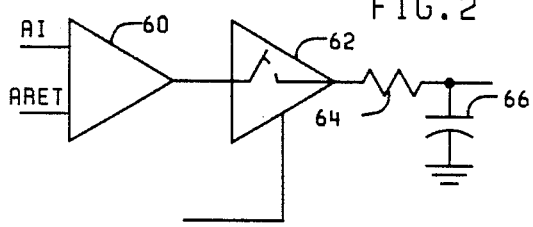

The sample and hold circuitry illustrated in FIG. 2 produces consistent signal levels provided the duration of the sample signal is constant and the interval between occurrences of the sample signal is constant. Variations of either of these periods will affect the value stored on the storage capacitor 66 over time. A duplicate of the circuit of FIG. 2 including the storage capacitor is provided for each analogue input signal.

Figure 3:
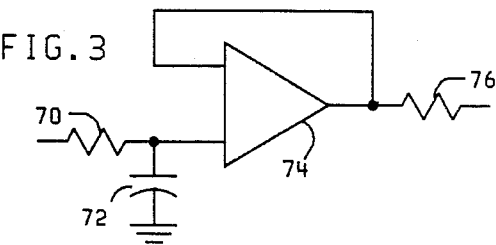
FIG. 3 is a schematic diagram of the circuitry of an output analogue signal store and output buffer.

The output analogue store and output buffer will be described with reference to FIG. 3. Each output of the analogue demultiplexer 50 of FIG. 1 is connected to a resistor-capacitor network comprising a resistor 70 and capacitor 72 as shown in FIG. 3. The storage capacitor 72 is charged to the value of a selected analogue signal during the interval of the control signal SDA. Thereafter, the value stored at the storage capacitor 72 decays through the high impedance of the following buffer amplifier 74. A current limiting resistor 76 is provided in the output of the output buffer amplifier 74. As in the case of the analogue input signal store, the analogue output signal store produces consistent signal levels when the duration of the control signal SDA is constant and the interval between occurrences of a control signal for a selected analogue output signal is constant. These periods are controlled by the predetermined sequence of control signals produced by read-only memory 34.

By providing the read-only memory in which the sample, input select, and output select signals are stored, programmed management of the translation of analogue signals between the digital control and the controlled process is achieved. This technique provides for the monitoring and control of a plurality of analogue signals while relieving the digital control processor of the considerable time burdens associated with the sampling, storing, and converting of analogue signals. The use of the dual port memory for exchanging digital signals between the digital control and the analogue section provides increased flexibility in such exchanges, allowing the digital control to read and write digital values at times when the analogue section is not accessing the dual port memory.

While the invention has been described with reference to the preferred embodiment, and while the preferred embodiment has been described in detail, it is not the intention of applicant to limit the scope of the invention to such detail. Rather, applicant intends that the scope of the invention be defined by the appended claims and all equivalents thereto.

What is claimed is:

1. A method of process control wherein a continuous process is controlled by a digital control receiving sets of digital input signals and producing sets of digital output signals, the process being monitored and controlled by a plurality of analog process signals including analog input signals representing values of process parameters and analog output signals representing values of controllable process variables, the method comprising the steps of:
   (a) repetitively producing, asynchronously with activity of the digital control, clock signal at a predetermined repetition rate;
   (b) translating the plurality of analog process signals between the continuous process and the digital control in response to the clock signal by executing the steps of:
      (i) periodically storing samples of a plurality of analog input signals;
      (ii) periodically producing a set of digital input signals in response to a selected stored analog input signal sample; and
      (iii) periodically storing an analog output signal in response to a set of digital output signals.

2. The method of claim 1 wherein the step of storing samples of plurality of analogue input signals further comprises the steps of:
   (a) periodically producing in response to the clock signal a sample signal for sampling a plurality of analogue input signals; and (b) storing an instantaneous value of each of the plurality of analogue input signals in response to the sample signal.

3. The method of claim 1 wherein the step of producing a set of digital input signals further comprises the steps of:
(a) periodically producing a set of input select signals in response to the clock signal, the set of input select signals identifying a selected stored analogue input signal sample;
(b) selecting the identified stored analogue input signal sample in response to the set of input select signals; and
(c) converting the selected analog input signal sample to a set of digital input signals.

4. The method of claim 3 wherein the step of converting the selected analogue input signal sample to a set of digital input signals further comprises the steps of:
(a) periodically producing a convert signal in response to the clock signal, the convert signal enabling the conversion of an analogue signal to a set of digital signals; and
(b) converting the selected analogue input signal sample to a set of digital input signals in response to the convert signal.

5. The method of claim 1 wherein the step of storing an analog output signal further comprises the steps of:
(a) periodically producing a set of output select signals in response to the clock signals, the set of output select signals identifying a selected signal store;
(b) converting a set of digital output signals to an analogue output signal; and
(c) storing the analog output signal in the selected signal store.

6. The method of claim 5 wherein the step of converting the set of digital output signals to an analogue output signal further comprises the steps of:
(a) periodically producing a digital to analogue write signal in response to the clock signal, the digital to analogue write signal enabling the conversion of a set of digital signals to an analogue signal; and
(b) converting the set of digital output signals to an analogue output signal in response to the digital to analogue write signal.

7. An apparatus for process control wherein a continuous process is controlled by a digital control receiving sets of digital input signals and producing sets of digital output signals, the process being monitored and controlled by a plurality of analog process signals including analog input signals representing values of process parameters and analog output signals representing values of controllable process variables, the apparatus comprising:
(a) means for repetitively producing, asynchronously with activity of the digital control, a clock signal at a predetermined repetition rate;
(b) means responsive to the clock signal for translating the plurality of analog process signals between the continuous process and the digital control including:
(i) means for periodically storing samples of a plurality of analog input signals;
(ii) mean for periodically producing a set of digital input signals in response to a selected stored analog input signal sample; and
(iii) means for periodically storing an analog output signal in response to a set of digital output signals.

8. The apparatus of claim 1 wherein the means for translating the plurality of analogue process signals further comprises:
(a) an addressable storage means in which are stored at predetermined locations:
(i) sample signals for sampling a plurality of analogue input signals;
(ii) sets of input select signals, each set of input select signals identifying a selected stored analogue input signal sample;
(iii) convert signals for enabling conversion of an analogue signal to a set of digital signals;
(iv) digital to analogue write signals for enabling conversion of a set of digital signals to an analogue signal;
(v) sets of output select signals, each set of output select signals identifying a selected analogue signal store; and
(b) an address counter responsive to the clock signal for sequentially generating address signals representing the predetermined locations thereby periodically producing a sample signal, a set of input select signals, a convert signal, a digital to analogue write signal, and a set of output select signals.

9. The apparatus of claim 8 wherein the means for periodically storing samples of a plurality of analogue input signals further comprises means responsive to the sample signal for storing a plurality of analogue input signal samples.

10. The apparatus of claim 9 wherein the means for storing a plurality of analogue input signal samples further comprises:
(a) a plurality of storage capacitors; and
(b) means responsive to the sample signal for temporarily connecting each analogue input signal to a storage capacitor.

11. The apparatus of claim 8 wherein the means for periodically producing a set of digital input signals further comprises:
(a) means responsive to the set of input select signals for selecting a stored analogue input signal sample; and
(b) means responsive to the convert signal for converting the selected stored analogue input signal sample to a set of digital input signals.

12. The apparatus of claim 8 wherein the means for periodically storing an analogue output signal further comprises:
(a) means responsive to the digital to analogue write signal for converting a set of digital output signals to an analogue output signal; and
(b) means responsive to the set of output select signals for storing the analogue output signal in the selected analogue signal store.

13. The apparatus of claim 12 wherein the means for storing the analogue output signal further comprises:
(a) a plurality of storage capacitors; and
(b) means responsive to the set of output select signals for coupling the analogue output signal to a storage capacitor identified by the set of output select signals.

* * * * *